March 5, 1957  E. A. O'NEIL ET AL  2,783,957
AIRCRAFT BARRIER

Filed Dec. 12, 1952  3 Sheets-Sheet 1

Inventors
Edgar A. O'Neil
Alex F. Jackson
By
Walter S. Paul
Attorneys

March 5, 1957    E. A. O'NEIL ET AL    2,783,957
AIRCRAFT BARRIER
Filed Dec. 12, 1952    3 Sheets-Sheet 2
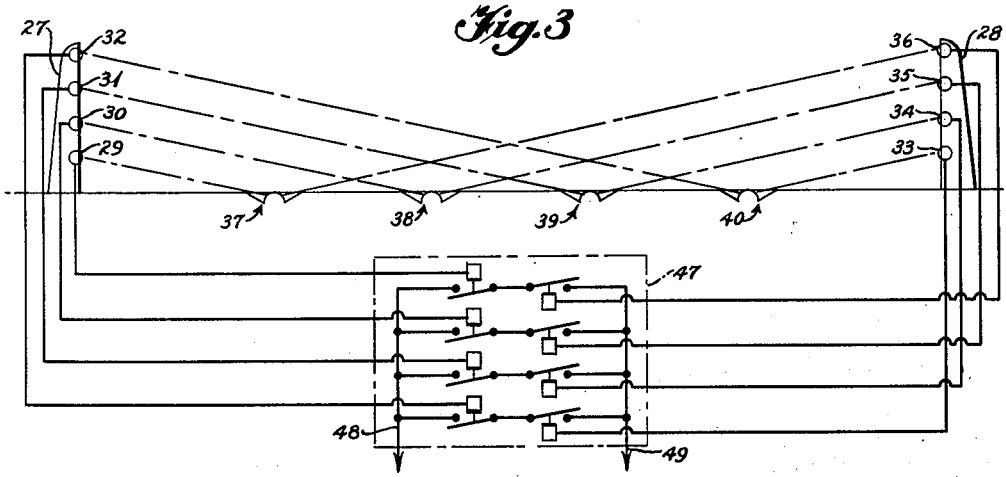
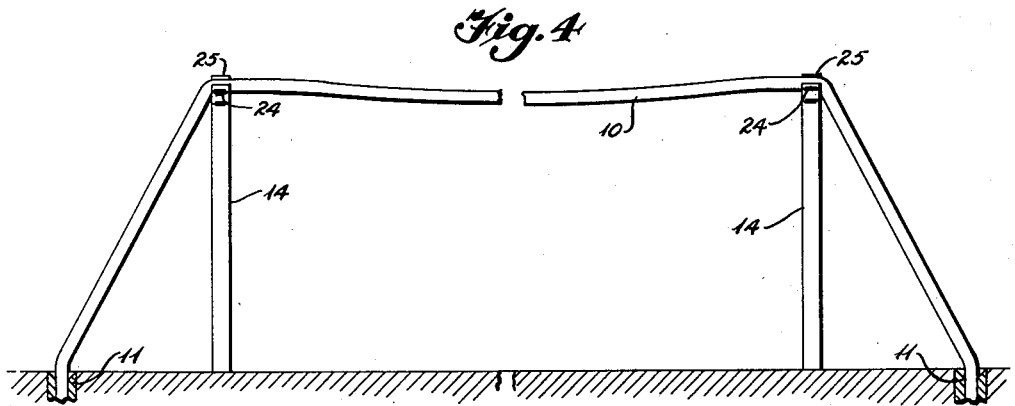
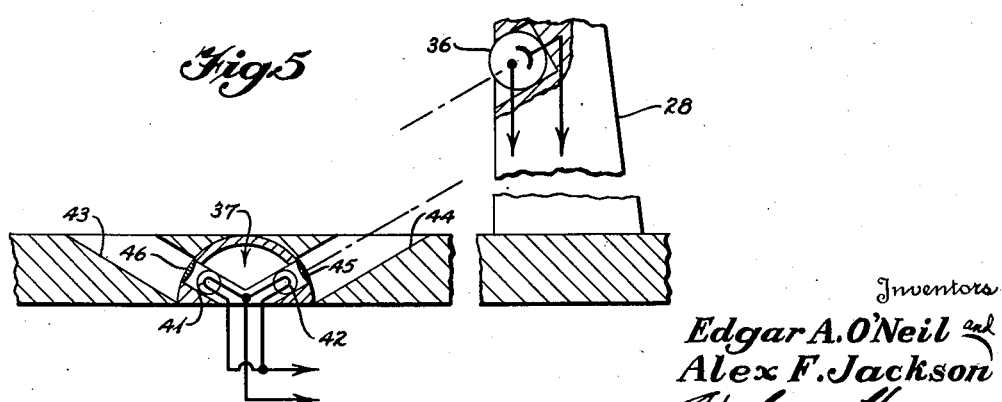
Inventors
Edgar A. O'Neil and
Alex F. Jackson
By
Walter S. Pawl
Attorneys March 5, 1957  E. A. O'NEIL ET AL  2,783,957
AIRCRAFT BARRIER
Filed Dec. 12, 1952  3 Sheets-Sheet 3

INVENTORS
EDGAR A. O'NEIL
ALEX F. JACKSON

BY
R. S. Tompkins
ATTORNEYS

United States Patent Office 2,783,957
Patented Mar. 5, 1957

2,783,957

AIRCRAFT BARRIER

Edgar A. O'Neil, Englewood, and Alex F. Jackson, East Orange, N. J., assignors, by mesne assignments, to the United States of America as represented by the Secretary of the Navy Application December 12, 1952, Serial No. 325,506

8 Claims. (Cl. 244—110)

This invention relates to an emergency barrier adapted to be mounted on ships of the aircraft carrier type for arresting aircraft which are not arrested in a normal manner by the tail hook engaging the athwartship arresting wires stretched across the flight deck.

The arresting wires which are adapted to engage the tail hook of an aircraft are supported at the port and starboard sides of the fantail of the carrier by spring loaded yielding elements which hold the wires a few inches above deck level. The ends of the wires are connected to a standard arresting engine assembly below the flight deck. Should the tail hook fail to engage the arresting wires a sudden danger exists, and the pilot may be able to touch the deck and take off again. However, this is almost always precluded by the lack of deck space in which a takeoff may be made. Moreover, the forward part of the flight deck may be covered with parked planes, or it may be that the carrier is launching and receiving aircraft simultaneously. Failure to arrest the aircraft soon after the tail hook misses the arresting cable may result in drastic damage to the landing aircraft, damage to considerable equipment and planes above-deck and injury or loss of life to the pilot and attending crew.

Up to the present time many types of barriers have been used to arrest planes which fail to be arrested in the normal manner. These barriers may be in the form of a plurality of vertically spaced cables mounted athwartship of the flight deck forward of the tail hook arresting wires. The ends of the cables are connected to conventional arresting engines for stopping the aircraft in a predetermined distance. The barrier may be in the form of a net which stretches across the deck. These cables or nets however almost always result in quite extensive damage to the aircraft. Also, there is present the potential hazard of propeller engagement by the barrier cable. The wires or net often becomes wrapped around the propeller and propeller shaft and results in damage to both aircraft and cables. Due to the fact that shipboard repair facilities are quite limited, the use of the aircraft is lost. The landing of each aircraft is normally accomplished in a short period of time and the time interval between landings is also short. The aircraft which are to be taken aboard normally fly in an orbit overhead, dropping a few hundred feet in altitude with each orbit until they are taken aboard. Therefore, if the barrier is damaged beyond repair, other arrangements must be made for landing the aircraft. Furthermore, some aircraft may have a mechanical failure of some sort and have to land. For these and other similar reasons a properly designed barrier apparatus should be of such a construction that in its operation minimum damage will result in the aircraft and the barrier.

It is an object of the present invention to provide a barrier which will act as an emergency arresting apparatus for aircraft and will be capable of stopping the the aircraft with a minimum of damage to the landing airplane and without hazard to the pilot or crew.

Another object of the invention is to provide a barrier of the aforementioned type which is universal in nature, i. e. one which is adaptable with minor changes to all types of aircraft carriers and capable of use for all types of aircraft which are designed to land aboard aircraft carriers.

Another object of this invention is to furnish a barrier that is capable of quick erection and lowering and does not interfere with aircraft taxying up the deck or flying off the deck on fly-away take-offs.

Still another object of the instant invention is to provide a barrier which is actuated by a part of the aircraft so that the barrier may be raised at the proper moment to miss the aircraft propeller or nose-wheel and contact the main landing gear struts at a point adjacent to the fuselage.

A further object of the invention is to furnish a plurality of vertically aligned photoelectric cells on the port and starboard sides of the carrier which are associated with transversely spaced light sources on the flight deck therebetween, the arrangement being such that both main wheels of the aircraft are required to energize the barrier actuating mechanism.

A still further object of this invention is to provide photoelectric cells and light sources as aforementioned wherein each light source supplies a ray of light to a single cell on opposite sides of the flight deck, the circuit arrangement being such that at least one light source must be straddled by the wheels of said aircraft so as to break the source of light to the cells associated therewith in order to actuate the barrier actuating mechanism.

Other objects and many of the attendant advantages of this invention will be readily appreciated as the same becomes better understood by reference to the following detailed description when considered in connection with the accompanying drawings wherein:

Fig. 3 is a schematic view of the photoelectric cell mounting arrangement and control circuit therefor;

Fig. 4 is a view taken on lines 4—4 of Fig. 1 and shows the barrier cable in its raised position;

Fig. 5 is an enlarged sectional view of one of the light sources and one of its associated photoelectric cells taken on lines 5—5 of Fig. 1;

Figure 1:
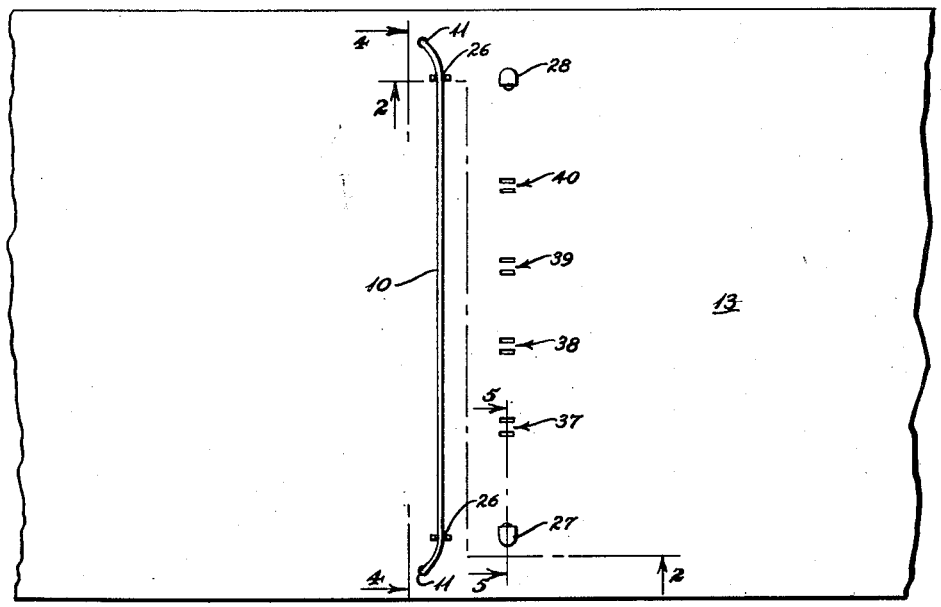
Fig. 1 is a plan view of one form of barrier as mounted on the flight deck of the aircraft carrier, the latter being fragmentarily shown.
Figure 2:
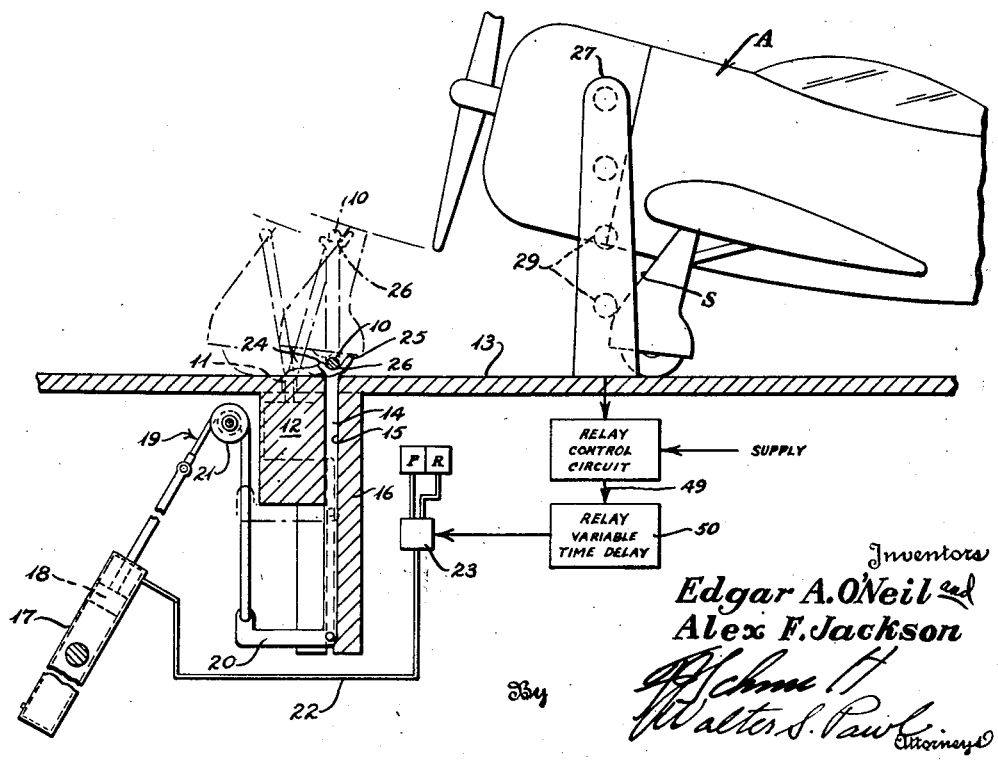
Fig. 2 is a partially schematic sectional view of the barrier taken on the line 2—2 of Fig. 1, showing the raising mechanism in its inoperative position in solid lines and in its operative position in dotted lines.
Figure 6:
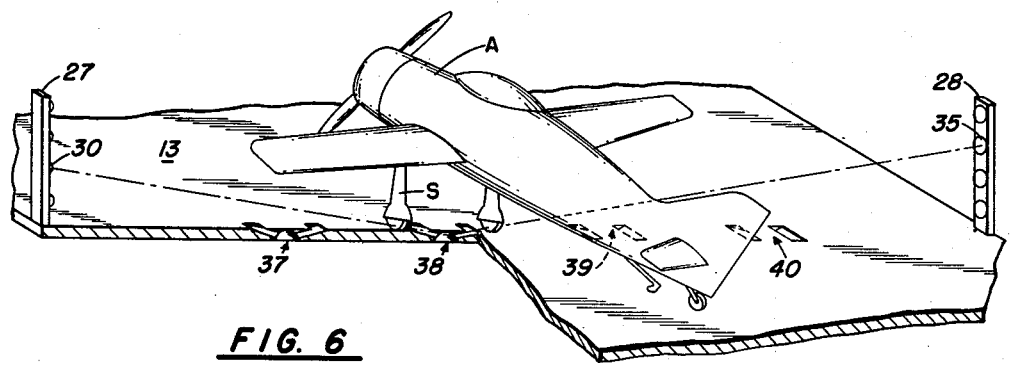
Fig. 6 is a partial schematic view showing the landing wheels of an aircraft straddling one of the light sources and interrupting the beams of light directed towards the photoelectric cells.

In developing an emergency barrier apparatus which is universal in design, it is necessary to determine the structural part of the aircraft best suited to engage the barrier cable. After considerable study, it was decided that the main landing gear struts were the strongest structural members available for this purpose. Complications arose, however, in providing a cable which would engage the struts and yet miss the aircraft propeller, and in some aircraft, the nose-wheel. Thus, the barrier cable has been designed to lie flat on or in the flight deck in an inoperative position. For convenience a transverse groove in the flight deck may be provided for nesting the cable therein. In this manner the cable will not interfere in any way with normal use of the flight deck. As shown in Figs. 1, 2 and 4 the barrier cable 10 extends arthwartship of the flight deck 13 with the ends thereof extending through sheaves 11 in the flight deck and connected to conventional arresting engine apparatus 12 below the flight deck. The arresting engines are shown in block form in Fig. 2 and may be of any conventional design which will permit an arresting action by cable 10. Cable 10 is engaged adjacent sheaves 11 by vertically extending erecting members 14. These members may be of any desired cross-sectional shape and are adapted to be housed in female guides 15 having a complementary configuration. The upper end of each erecting member is bifurcated so as to form a pair of projections 24 and 25 with a seat 26 therebetween, said seat being adapted to receive the barrier cable. Projection 24 is somewhat lower than projection 25 so that when the main struts S of the aircraft A engage the cable 10 it is pulled from its seat on the erecting members as the aircraft A moves forward. Each guide 15 may be formed in a below-deck structural part such as member 16. It will be noted that Fig. 2 shows the erecting mechanism for only one end of the barrier cable but it will be understood that a similar mechanism is provided for erecting the opposite end of the barrier cable 10.

The actuating mechanism or device has been shown somewhat schematically in Fig. 2 and includes a hydraulic cylinder 17 which houses a piston 18. A cable 19 is connected at one end to a bracket 20 fixed to the lower end of erecting member 14 and to the piston rod of piston 18. A suitable guide, as pulley 21, is provided for the cable 19 in order to prescribe the cable travel. Fluid pressure is supplied to one end of cylinder 17 through conduit 22 from a high pressure fluid source P. An electrically operative solenoid valve 23 regulates the flow of high pressure fluid through conduit 22 to cylinder 17. Valve 23 is of the three-way type. In one position, when the solenoid is deenergized, conduit 22 drains the fluid from the cylinder 17 into reservoir R, and in the energized position, conduit 22 is connected to the high pressure source P.

The actuation of solenoid valve 23 is caused by triggering means including a plurality of photoelectric cells mounted on the port and starboard sides of the flight deck in a pair of stanchions 27 and 28, respectively, that are laterally spaced apart to define an aircraft passageway on the deck of the carrier. Each stanchion houses a plurality of vertically spaced photoelectric cells, stanchion 27 having cells 29, 30, 31 and 32 therein and stanchion 28 having cells 33, 34, 35 and 36 therein. A plurality of sources 37, 38, 39 and 40 capable of emitting electromagnetic radiations, as light beams, in two directions are positioned in spaced relation between the stanchions at about deck level, and the photosensitive cells are directed toward the sources. As seen in Fig. 5 each light source is positioned within the flight deck and includes filaments 41 and 42 which send light rays directed through passages 43 and 44, respectively, to the photosensitive cells on opposite sides of the deck. As shown filament 42 of dual light source 37 directs a beam of light through lens 45 to photoelectric cell 36 in stanchion 28. Filament 41 directs a stream of light through lens 46 to photoelectric cell 29 in stanchion 27. Thus, each light source directs light to photocells on opposite sides of the flight deck. As shown in Fig. 5, light source 40 directs light to photoelectric cells 33 and 32; light source 39 directs light to photoelectric cells 34 and 31; light source 38 directs light to photoelectric cells 35 and 30; and as described above, light source 37 directs light to photoelectric cells 36 and 29.

Most of the aircraft now used aboard aircraft carriers have three-wheel, tricycle type landing gear. Since the present barrier is designed to be actuated by the aircraft wheels breaking the light source from its associated photoelectric cell, the control circuit must be such that the nose wheel will not cause the barrier to be raised. However, the control circuit should be such that the two main wheels will break the light supply to photoelectric cells on opposite sides of the flight deck to thereby raise the barrier. In the control circuit shown in Fig. 3, the arrangement is such that the two main wheels must straddle a light source so as to break the light supply from said source to the photoelectric cells on opposite sides of the flight deck. For example, as seen in Fig. 5, if both wheels straddled light source 37 the barrier will not be raised until the light supply from filaments 41 and 42 to cells 29 and 36, respectively, is broken. The particular relay control circuit shown is illustrated by reference numeral 47. The relays are adapted to provide a closed circuit between the 24 v. D. C. supply shown connected to electrical lead 48 and lead 49 connected to variable time delay relay 50. The latter is connected by appropriate wiring to the solenoid valve 23 to actuate the same. It is apparent from Fig. 3 that if merely the aircraft propeller or the tricycle landing gear front wheel broke one of the light rays, only one of a pair of illustrated relays is energized, thus leaving the circuit having solenoid valve 23 in it, open.

It is apparent that variations from the specifically disclosed embodiment of the invention may be made without departing from the scope of the following claims.

What is claimed is:

1. For use on the deck of an aircraft carrier, a safety barrier system comprising a pair of stanchions spaced laterally from each other and rising above the deck, a light source located substantially at deck level and arranged to emit a beam of light toward one stanchion and another beam of light toward the other stanchion, a barrier member movable between a first position substantially at deck level and a second position substantially above deck level and adapted to be contacted by an aircraft landing on the deck of the carrier in said second position, elevating means adjacent to and in operative relationship to said barrier member for raising it above deck level to said second position, a normally opened control circuit connected to said elevating means and means arranged on each of said stanchions to receive a beam from said source, each of said last-mentioned means being independently coupled with said circuit to hold the latter normally open.

2. For use on the deck of an aircraft carrier, a safety barrier system comprising a pair of stanchions spaced laterally from each other and rising above the deck, a light source located substantially at deck level and arranged to emit a beam of light toward one stanchion and another beam of light toward the other stanchion, a barrier member movable between a first position substantially at deck level and a second position substantially above deck level and adapted to be contacted by an aircraft landing on the deck of the carrier in said second position, elevating means positioned beneath said barrier member for raising it above deck level to said second position, and first and second photoelectric cell means arranged on each of said stanchions respectively to receive a beam from said source, a control circuit connected to said elevating means and provided with two normally open relays independently coupled with said circuit to hold the latter normally open, said first photoelectric cell means located on one stanchion and connected with one relay, said second photoelectric cell means located on the other stanchion and connected with the other relay, whereby both of said relays will close completing the control circuit when both beams of light are interrupted thereby actuating the elevating means to move said barrier to said second position.

3. In an aircraft carrier deck, a safety barrier system comprising a first stanchion, a second stanchion spaced from the first stanchion, a plurality of photosensitive cells mounted in vertically spaced relation on said stanchions and directed toward the deck between said stanchions, a plurality of light sources spaced from each other and disposed between said stanchions, each source being adapted to supply light beams to energize one cell on one stanchion and one cell on the other stanchion, a barrier member movable between a first position substantially at deck level and a second position substantially above deck level, a barrier member actuating device adjacent to and in operative relationship to said barrier member, and control circuit means connecting said photosensitive cells to said actuating device, said photosensitive cells on each of said stanchions being independently coupled with said circuit to hold the latter normally open, whereby said circuit is responsive to the deenergization of a cell on the first stanchion and a cell on the second stanchion that are energized by the same light source for actuating said barrier member actuating device.

4. In an aircraft carrier deck, a safety barrier system comprising a barrier member movable between a first position substantially at deck level and a second position substantially above deck level, a barrier member operating device adjacent to and in operative relationship to said barrier member, a first stanchion and a second stanchion spaced laterally therefrom to form an aircraft passageway, pairs of photosensitive cells, one cell of each pair being on the first stanchion and the other cell of each pair disposed on the second stanchion, all of said cells being directed downwardly and inwardly of said passageway, a light source for each pair of cells to supply light beams simultaneously to energize the two cells of each pair, and control circuit means connecting said pairs of photosensitive cells to said barrier member operating device, one cell of each pair of photosensitive cells being independently coupled with said circuit to hold the latter normally open, whereby said circuit is responsive to the deenergization of both cells of any pair of cells for actuating said barrier member operating device.

5. In combination with an aircraft carrier deck, a safety barrier system comprising a barrier member, a barrier member elevating device positioned beneath and connected thereto to lift the barrier member from generally deck level to a position to be contacted by aircraft wheel struts as the aircraft moves over the deck for landing, a pair of stanchions rising above the deck and spaced apart to define an aircraft passageway, a light source mounted at deck level in said passageway, means responsive to the straddling of said source by two laterally aligned aircraft wheels including a photoelectric cell mounted on each stanchion and facing toward said source so as to be continually energized by said source until interrupted by the aircraft wheels and wheel supports as they straddle the source to interrupt radiation reception in both cells, and control circuit means connecting said photoelectric cells to said barrier member elevating device, each of said photoelectric cells being independently coupled with said circuit to hold the latter normally open, said control circuit including an electrical circuit that is closed in response to interruption in the reception of radiations in both of said cells for operating said elevating device.

6. The combination of claim 5 and; said elevating device including a fluid circuit having a fluid pressure means therein, a regulating valve in said fluid system, and means connected to and responsive to the electrical circuit when closed to operate said valve.

7. The combination of claim 6 and; said last mentioned means being a variable time delay relay.

8. In combination with an aircraft carrier deck having a runway strip, a safety barrier system comprising barrier means adapted to be elevated from said runway strip, elevating means adjacent to and in operative relationship to said barrier means for raising it, a light source located substantially at deck level on the strip and arranged to emit a beam of light to either side of said strip, means positioned on either side of said strip and above said deck for receiving the emitted light beams, a normally open control circuit connecting said emitted light receiving means to the elevating means, each of said means for receiving light beams being independently coupled with said circuit to hold the latter normally open whereby the control circuit is closed thereby actuating said barrier raising means when both of said beams of light are interrupted by the straddling of said light source by two aligned aircraft wheels upon landing on said deck and moving along said strip.

References Cited in the file of this patent
UNITED STATES PATENTS

| | | |
|---|---|---|
| 2,037,671 | Yannes | Apr. 14, 1936 |
| 2,448,039 | Lynn | Aug. 31, 1948 |
| 2,712,912 | Hattan | July 12, 1955 |